US009942539B2

(12) United States Patent
Tait et al.

(10) Patent No.: US 9,942,539 B2
(45) Date of Patent: *Apr. 10, 2018

(54) SCANNING LASER-BASED THREE DIMENSIONAL (3D) DISPLAY SYSTEMS FOR VIEWERS WEARING 3D GLASSES

(71) Applicant: DISNEY ENTERPRISES, INC., Burbank, CA (US)

(72) Inventors: Thomas Tracey Tait, Santa Clarita, CA (US); Mark A. Reichow, Glendale, CA (US); Steven T. Kosakura, Tustin, CA (US); Genell Nikeya Hoechstetter, Los Angeles, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 266 days.

This patent is subject to a terminal disclaimer.

(21) Appl. No.: 14/727,363

(22) Filed: Jun. 1, 2015

(65) Prior Publication Data

US 2016/0353095 A1    Dec. 1, 2016

(51) Int. Cl.
    *G02B 27/22*    (2018.01)
    *H04N 13/04*    (2006.01)
    (Continued)

(52) U.S. Cl.
    CPC ......... *H04N 13/0431* (2013.01); *G02B 27/22* (2013.01); *H04N 9/3129* (2013.01);
    (Continued)

(58) Field of Classification Search
    CPC ............. H04N 13/0431; H04N 13/004; H04N 13/0459; H04N 13/0497; H04N 13/0059;
    (Continued)

(56) References Cited

U.S. PATENT DOCUMENTS 6,283,597 B1 *   9/2001   Jorke ................. G02B 27/2207
                                                348/766
2008/0158672 A1 * 7/2008   McCosky .......... H04N 13/0431
                                                359/464

(Continued)

OTHER PUBLICATIONS

Most Insane Immersive Movie Experience Ever, Part 2. https://www.youtube.com/watch?v=N_cKsOe7hLI, published on Nov. 29, 2011 per https://web.archive.org/web/20111203081127/https://www.youtube.com/watch?v=N_cKsOe7hLI.*

*Primary Examiner* — Bumsuk Won
*Assistant Examiner* — Collin X Beatty
(74) *Attorney, Agent, or Firm* — Marsh Fischmann & Breyfogle LLP; Kent A. Lembke

(57) ABSTRACT

A display system for creating three dimensional (3D) imagery for a viewer wearing 3D glasses such as wavelength multiplex visualization (WMV) technology glasses with a first lens passing colored light in a first range of wavelengths and with a second lens passing colored light in a second range of wavelengths. The system includes a first WMV light source outputting a first light stream onto a display surface, with the first light stream having a wavelength in the first wavelength range. The system includes a second WMV light source outputting a second light stream onto the display surface concurrently with the second light stream, with the second light stream having a wavelength in the second wavelength range. The WMV light sources are scanning lasers that each may be a scanning laser providing red, green, or blue coherent light or a full red, green, and blue (RGB) scanning laser.

21 Claims, 7 Drawing Sheets

(51) Int. Cl.
 *H04N 13/00* (2018.01)
 *H04N 9/31* (2006.01)

(52) U.S. Cl.
 CPC ......... *H04N 9/3161* (2013.01); *H04N 13/004* (2013.01); *H04N 13/0459* (2013.01); *H04N 13/0497* (2013.01)

(58) Field of Classification Search
 CPC ........... H04N 13/0285; H04N 13/0422; H04N 13/0429; H04N 13/0456; H04N 9/3129; H04N 9/3161; G02B 27/2207; G02B 27/22; G02B 27/102; G02B 27/2235
 USPC .. 359/22, 23, 25, 26, 32, 33, 466, 470, 475, 359/462, 464; 348/E9.026, E13.022, 348/E13.062; 353/7; 349/15
 See application file for complete search history.

(56) References Cited

U.S. PATENT DOCUMENTS

| | | | | |
|---|---|---|---|---|
| 2012/0105807 A1* | 5/2012 | Volpe | ................... | G02B 27/102 353/7 |
| 2016/0373731 A1* | 12/2016 | Smoot | ................ | H04N 13/0431 |
| 2017/0127052 A1* | 5/2017 | Reichow | ............ | H04N 13/0431 |

\* cited by examiner

SCANNING LASER-BASED THREE DIMENSIONAL (3D) DISPLAY SYSTEMS FOR VIEWERS WEARING 3D GLASSES

BACKGROUND

1. Field of the Description

The present description relates, in general, to three dimensional (3D) projection and display technology including 3D glasses or stereo glasses worn by viewers to perceive 3D imagery, and, more particularly, to 3D stereo display systems that are adapted for creating 3D effects or imagery with 3D content or media but without the need for conventional 3D projectors.

2. Relevant Background

Recently, there has been an increased interest in providing movies and other image-based content to viewers in 3D form, and there has been significant research in the past on technologies to produce 3D imagery. Most 3D technologies require the viewers to wear 3D glasses (or other headgear or other filters, which will be labeled "3D glasses" herein) such that left eye images are received by their left eye and right eye images are received by their right eyes. The combination of these right and left eye images is perceived by the viewers as 3D images or imagery (or stereo images).

Polarization and wavelength multiplex visualization ("WMV") are two main types of 3D technologies that are in widespread use in cinema applications and in other entertainment venues including amusement or theme parks (e.g., in 3D rides, 3D displays, and other park attractions). In each of these 3D technologies or systems, the displays or projection systems have relied upon or targeted raster-based displays such as video projection, film, displays, and the like.

With polarized technology, the viewer wears low-cost eyeglasses that contain a pair of different polarizing filters. Each of the viewer's eyes sees a different image (right eye image and left eye image that were ultimately provided by cameras spaced apart the intraocular distance) because the filters pass only light having a particular polarization (i.e., matching the eyeglass filter) and block the light polarized differently (e.g., in the other polarization direction). Polarized technologies (linear and/or circular) are used to produce a 3D effect by projecting or displaying the same scene for viewing by both eyes, with the scene being depicted from slightly different offsets to create the necessary parallax to provide a 3D image. Use of this technology has the advantages of low cost glasses but is inefficient with light causing loss of brightness and requires a silvered screen to maintain polarization.

Due to these and other disadvantages with such 3D technologies, there has been increased interest in the use of wavelength multiplex visualization (also known as interference filters or comb filters and generally labeled "WMV" or "WMV technology" herein). WMV technology is based on a system of color. The specific color frequencies (e.g., left-eye RGB frequencies and right-eye RGB frequencies) utilized in each technology (or by each company's WMV products) are typically based on the specific delivery system and other parameters and company-specific goals.

Presently, there are at least two types of WMV technology used to provide 3D displays. In the first exemplary type of WMV technology-based 3D systems (e.g., Dolby 3D systems provided by Dolby Laboratories, Inc. or other WMV-based systems provided by other developers/distributors), a single projector is used that can project both left and right eye images using an alternate color wheel placed in the projector. The color wheel contains one more set of red, green, and blue filters in addition to the red, green, and blue filters found on a typical color wheel. The additional sets of three filters are able to produce the same color gamut as the original three filters but transmit light at different wavelengths. 3D glasses with complimentary dichroic filters in the lenses are worn by a viewer that filter out either one or the other set of the three light wavelengths. In this way one projector can display the left and right stereoscopic images simultaneously, e.g., by a stereoscopic projection process that is labeled herein as a first type of wavelength multiplex visualization or WMV (or is categorized as one form of wavelength multiplex visualization that may also be considered a narrowband-based WMV or a WMV implementing one or more narrowband source of illuminating light paired with 3D stereo glasses worn by a viewer to properly filter light from these sources).

A second exemplary type of WMV-based 3D system (e.g., a Christie 6P system available from Christie Digital Systems USA, Inc. or another designer/distributor of this second type of WMV) is built on a fiber-coupled, 6-primary projection system architecture rather than filtered or polarized broadspectrum white light. In some systems using this second type of WMV, 6-Primary ("6P") laser projectors employ two sets of red, green, and blue (RGB) laser lights, with one set being for the left eye and one, with slightly different wavelengths, for the right eye, which is why this second type of WMV-based 3D system is considered to employ or provide wavelength multiplex visualization. The viewer wears 3D glasses in these systems that filter out the different wavelengths and direct the light to the intended eye. This second type of WMV may be thought of as primary or colored laser projector-based WMV. There are a number of advantages associated with these systems including: effectiveness with light as almost 90 percent of the light from the projector makes it to the viewer's eye; does not require a silvered screen and can be both rear and front projected on nearly any surface; can be viewed from multiple points of view with no hot spot and has uniform brightness without regard to a viewer's point of view; can be used in applications where a viewer may tilt or move their head; and has a broad color gamut. As with the first type of WMV system, the stereo glasses for this second type of WMV system are expensive, and the light module and other projection components are also relatively expensive.

An ongoing challenge for many applications is how to integrate 3D projection or display systems in larger facilities rather than in the more contained theater setting. For example, many amusement parks include 3D theaters with long queues and 3D ride systems that now utilize wavelength multiplex visualization ("WMV") technology such that visitors (or "viewers") are now wearing stereo glasses adapted for use with such technologies rather than polarized glasses. These projection systems work through the realization that all humans see all colors using only the three color sensors in the eye for red, green, and blue. All other colors are synthesized by humans from mixtures of these three fundamental colors. As discussed above, for example, the first type of WMV system functions by splitting the red, green, and blue images to be displayed/projected into two narrow wavelength bands (e.g., Red1, Green1, and Blue2 or RGB1 and Red2, Green2, and Blue2 or RGB2). Then, for a left stereo image, the projector (or projectors if two are used) may project light with the wavelength bands for RGB1 and, for a right stereo image, the projector may project light with the wavelength bands for RGB2. The color separation is done with very narrowband color filters or lenses provided in the stereo glasses (e.g., with three filters overlaid for each of the viewer's eyes) such that the lens over the left eye only passes the RGB1 light or images while the lens over the right eye only passes the RGB2 light or images.

Projectors for systems employing wavelength multiplex visualization, which in combination may be considered conventional WMV projectors (or simply WMV projectors), narrowband multiplexing projectors, and the like, are expensive such that their use is generally limited to large-scale theatrical experiences. However, in amusement park rides and some theater settings, the viewers may be offered and be wearing the 3D stereo glasses designed for these systems outside of the theater or projection space. For example, a 3D-based ride may include one or more theater-type portions where a WMV projector(s) is used to project 3D images viewable by the ride participants. However, the ride participants will be wearing the 3D stereo glasses in other portions of the ride, which may be 50 to 90 percent of the length of the ride, where there is no 3D imagery being projected. One solution would be to provide the WMV projectors along the entire length of the ride, but this solution is typically discarded as being prohibitively expensive.

Hence, there remains a need for display systems and methods for providing 3D imagery to viewers such as in locations or spaces inside, nearby, and even outside of a conventional 3D theater setting (e.g., in the queue to or from the theater) and inside or even outside of portions of a ride configured for 3D projection. There is also a desire in some cases to provide 3D imagery and effects with higher brightness and/or in higher ambient light settings (e.g., not just in ideal low-light theater-type viewing environments).

SUMMARY

The inventors recognized that presently there are many situations where participants in 3D entertainment activities, such as a 3D theater, a 3D-based ride, and the like, are wearing 3D stereo glasses while they are in spaces where no 3D imagery is being projected. For example, a 3D ride may utilize a type of wavelength multiplex visualization (WMV) technology (e.g., Dolby 3D, Christie 6P, or other wavelength multiplex visualization technologies presently utilized or yet to be developed), and the riders wear their 3D stereo glasses or 3D glasses for WMV systems (suited for the particular technology and its wavelengths) throughout the ride even though WMV-based 3D projectors are only provided in one to several locations along the ride (e.g., for 10 percent or less of the ride length). It was understood that it would be useful to provide display systems in spaces where viewers are wearing wavelength multiplex visualization glasses (e.g., WMV-based glasses and all such glasses referred to herein as "3D stereo glasses" or "3D glasses" or "WMV glasses"), and these display systems should be configured to provide 3D imagery without the need for an expensive 3D projector or conventional WMV projector.

In one exemplary 3D display system, 3D imagery or effects are provided by operating a pair of light sources that are tuned to provide first and second (or left and right) streams of WMV-type light and that are controlled to project 3D content or media. Hence, the first and second light sources can be thought of as first and second WMV light sources operated not just to illuminate a scene but to project 3D media or content that can be viewed by a viewer wearing WMV glasses or 3D stereo glasses. For example, a pair of scanning lasers (e.g., red, blue, or green) may be used for the first and second WMV light sources, and the two scanning lasers are tuned to output a beam or stream of coherent light with a frequency falling within the range of frequencies passed through the left or right eye filter of the WMV glasses or that match the notch frequencies in the WMV glasses (e.g., the Dolby 3D glasses, the Christie 6P glasses, or other WMV glasses). Briefly, the light sources are chosen/configured to provide two streams of light with wavelengths matching light filtered by the two lenses/filters of the 3D stereo glasses such as wavelengths in the RGB1 wavelength bands and the RGB2 wavelength bands when the 3D stereo glasses are Dolby 3D or similar WMV glasses. In this manner, the viewer is able to see a full color and full stereo image (e.g., the display system provides a 3D effect or imagery without a 3D projector). The two scanning lasers are operated to project left and right eye content (e.g., 3D media). In other 3D display systems, full RGB (red, green, and blue) scanning lasers are utilized as the first and second WMV light sources/projectors.

The use of scanning lasers allows for volumetric displays of particle-based and other effects (e.g., pixie dust, sparks, streaks, explosions, and the like) to float off of the background projection and hover in space or in air in front of the viewers. These scanning laser-based 3D display systems are particularly well suited where more conventional WMV projected media is not sharp and vibrant enough to meet display designers' needs.

A unique feature of the display systems is that they can be used to add additional light-based elements or content to a WMV presentation (e.g., a WMV presentation in a theater, in stage-based show, in a theme park ride or attraction, and so on). These added elements (or content) are show or display components that could not be delivered through the primary video 3D system and media (e.g., the conventional WMV projector and its content would be missing the additional elements). The gamut may not be as high as that provided by the primary video 3D system and media, and the light itself is typically different. For example, a laser projector system may be used with a WMV projector, and the laser projector system may be designed and blended strategically with the WMV projector to achieve a display output or viewing experience that can be thought of as being hybrid (that was not provided prior to the display systems described herein). The laser projector system also has the advantage of being able to be used on scrims and transparent materials for an even deeper volumetric look. Video projection light by itself would not have the energy density to reflect on these types of transparent material to provide a desirable reflection of light back to the viewer's eyes.

More particularly, a display system is provided for creating three dimensional (3D) imagery for a viewer in a viewing space. The viewer is wearing 3D stereo glasses (e.g., WMV technology 3D glasses) with a first lens passing colored light in a first range of wavelengths and with a second lens passing colored light in a second range of wavelengths differing from the first range of wavelengths. The display system includes a display surface (e.g., a surface of a WMV 3D projection screen, a surface or prop near an amusement park ride path, a 3D set, and the like) facing the viewing space. The system also includes a first wavelength multiplex visualization (WMV) light source outputting a first light stream onto the display surface, with the first light stream having a wavelength in the first range of wavelengths. The system also includes a second WMV light source outputting a second light stream onto the display surface concurrently with the second light stream, with the second light stream having a wavelength in the second range of wavelengths.

In some implementations of the display system, the first and second WMV light sources each includes at least one scanning laser. For example, the scanning laser of each of the first and second WMV light sources may be a monochromatic scanning laser providing red, green, or blue coherent light. In another example, the scanning laser of each of the first and second WMV light sources may be a full red, green, and blue (RGB) scanning laser.

In the same or other embodiments, the first and second WMV light sources are media driven, whereby the first and second light streams provide left and right eye images of a 3D scene or object on the display surface. For example, the 3D display system may include a controller operating the first and second WMV light sources based on a media file defining at least one 3D object. During the 3D display system operations, the 3D object moves from a first location on the display surface to a second location on the display surface.

The system may also include a 3D set spaced apart from the display surface, and the first and second WMV light sources are controlled to move the 3D object from the display surface into the 3D set. The display system may also include a 3D projector projecting 3D content onto the display surface using light in the first and second ranges of wavelengths, and the projecting is performed concurrently with the outputting of the first and second light streams by the first and second WMV light sources, whereby the viewers concurrently perceive a blending of a pair of 3D objects. In some cases, the 3D projector takes the form of a projector implementing a narrowband-based WMV or a laser projector-based WMV.

DETAILED DESCRIPTION OF THE PREFERRED EMBODIMENTS

Briefly, the present description is directed toward three dimensional (3D) stereo display systems for creating 3D effects, e.g., displaying 3D objects or images, that are perceivable by viewers wearing 3D stereo glasses. Viewers, in a viewing space, wear glasses with lenses providing filters for the left and right eyes and suited for a particular wavelength multiplex visualization (WMV) technology such as a first type of WMV technology (e.g., Dolby 3D or the like), a second type of WMV technology (e.g., Christie 6P or the like), or another type of WMV technology that is already invented or yet to be invented. In other words, the WMV-based 3D glasses are suited for use with conventional WMV projectors and may be considered narrowband-type 3D glasses that are adapted to use each lens to pass a differing narrowband or small range of frequencies. The 3D stereo display systems may be positioned in an area or viewing space outside a 3D projection space to take advantage of the fact the viewers are wearing the 3D stereo glasses which allows light to be selectively provided to each of the viewer's left and right eyes for stereo experiences. For example, riders in a 3D ride may be entertained by 3D display systems in portions of the ride path that do not include 3D projectors as the 3D display systems are configured to provide additional 3D content building upon the WMV technology of the 3D stereo glasses. In other words, the 3D display systems can be thought of as being media-driven systems providing additional 3D imagery than that already provided by a conventional WMV projector.

Figure 1:
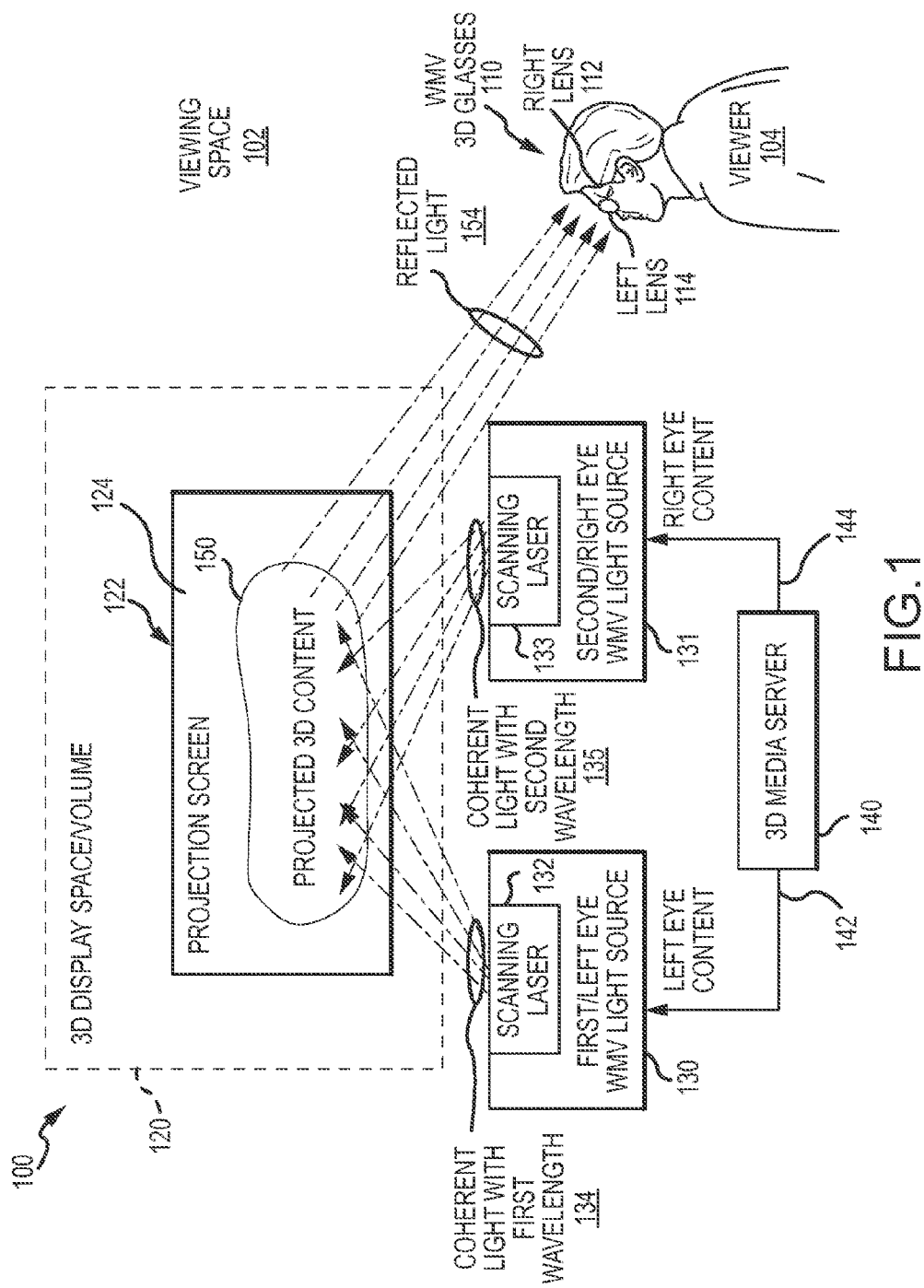
FIG. 1 is a diagram or functional block diagram of a 3D display system of the present description showing use of a pair of scanning lasers for first and second WMV light sources to provide a 3D effect or image for a viewer wearing WMV-based 3D glasses.

FIG. 1 illustrates an exemplary 3D display system 100 with a 3D display space/volume 120 provided adjacent to or near a viewing space 102. The viewing space 102 may be the space a ride vehicle passes through in an amusement/theme park ride, a theater or space outside or near a theater, or any other space in which a viewer 104 may pass or be located. The viewer 104 is shown to be wearing WMV 3D glasses 110 with a right lens 112 adapted to filter out all light except for light with a frequency falling within a first narrowband or range of frequencies (e.g., a first WMV technology range of light intended for use to provide right eye content) and with a left lens 114 adapted to filter out all light except for light with a second narrowband or range of frequencies (e.g., a second WMV technology range of light intended for use to provide left eye content). For example, the viewer 104 may have recently been viewing a 3D display (e.g., a 3D movie or animated clip) provided by a WMV projector (e.g., a Dolby 3D projector, a Christie 6P projector, or other conventional WMV projector) and still be wearing a pair of WMV glasses 110 suited to the WMV technology underlying that WMV projector.

The viewer 104 can observe a 3D display space or volume 120 that is shown, in this example, to include a projection screen or component 122 with a projection surface(s) 124 which may or may not be planar. The 3D display system 100 is operated to provide projected 3D content 150 on the surface 124 that causes light 154 to be reflected toward the viewer 104. The viewer 104 can perceive the content as stereo or as being in 3D because right eye content in the reflected light 154 passes through the filter (e.g., first WMV RGB filter) of the right lens 112 while left eye content in the reflected light 154 passes through the filter (e.g., second WMV RGB filter) of the left lens 114.

To provide the projected 3D content 150, the system 100 includes a pair of WMV light sources that provide the left and right eye content found in the reflected light 154. Specifically, a first (left eye) WMV light source 130 and a second (right eye) WMV light source 131 are operated by a 3D media server 140 to provide left eye content 142 and right eye content 144, respectively. In the embodiment shown, each light source 130, 131 includes a scanning laser 132, 133 to output coherent light 134, 135 based on the control signals/content 142, 144 to provide the projected 3D content 150. In this way, the scanning lasers 132, 133 are media driven by the 3D media server 140 to create a 3D effect for the viewer 104 wearing the 3D glasses 110.

The first or left eye scanning laser 132 is configured (e.g., tuned or with optical components such as filters) to output the light 134 as a beam of coherent light with a first wavelength falling within the range of light passed by the left lens 114 of the WMV glasses 110 (e.g., light within a first narrowband prescribed by the WMV technology underlying the 3D display system 100). The second or right eye scanning laser 133, in contrast, is configured (e.g., tuned or with optical components such as filters) to output the light 135 as a beam of coherent light with a second wavelength falling with the range of light passed by the right lens 112 of the WMV glasses 110 (e.g., light within a second narrowband prescribed by the WMV technology of the system 100 and differing than the first narrowband or range).

In some preferred embodiments, the two scanning lasers 132, 133 are monochromatic scanning lasers that may both be red, green, or blue or that may differ in their output monochromatic color. In these implementations of the system 100, the projected 3D content 150 will also be monochromatic (at least for each eye of the viewer 104 via lenses 110, 112). In other embodiments, one or both of the scanning lasers 132, 133 takes the form of a full RGB scanning laser. In these embodiments, the RGB scanning lasers 132, 133 are each configured to output three specific wavelengths (but differing from each other) for each color with each of these color-specific wavelengths falling within a range passed by one of the lenses 112, 114. In either case, the wavelengths of the coherent beams 134, 135 are tuned so as to fall within the notch frequencies or range of frequencies of the WMV technology for which the WMV glasses 110 are suited (e.g., notch frequencies of Dolby 3D glasses, Christie 6P glasses, or the like).

In some implementations such as the system 100 of FIG. 1, it may be desirable to provide the scanning laser-based 3D content in isolation or without other 3D projected content. However, there are many applications where it may be desirable to blend the scanning laser-based 3D content with other displayed content such as 3D content from a 3D projector (e.g., a WMV projector such as a Dolby 3D or Christie 6P projector or the like) so as to achieve a unique 3D effect. In other cases, the scanning laser-based 3D content may be initially provided on a surface used for 3D projection and then jump off this surface to a new surface(s) where no conventional 3D projection is provided or available.

With these differing embodiments in mind, the present description presents a display system (and corresponding methods) for providing a visual display by marrying or blending two or more types of light (e.g., WMV projector light with coherent beams from a pair of scanning lasers that are tuned to match outputs of the WMV projector). During operation of the display system, a first light type (e.g., light from a WMV video projector) may be projected onto a first canvas (e.g., a front or rear projection screen), and, then, a second light type (e.g., coherent light from a pair of scanning lasers or scanning laser projectors) may be projected onto the first canvas so as to be blended with the projected first light type. Next, the stream of the second type of light may be moved along a path or trajectory that causes it to leave or jump from the first canvas onto a second canvas, which may be spaced apart from the first canvas or abut the first canvas at an angle to create a volumetric display environment with the two (or more) canvases.

The second "canvas" may be configured as a 3D set (or display scene) with a number of elements with surfaces that reflect the second type of light to an audience. These reflective elements may include a backdrop (or projection screen), one-to-many reflective members spaced apart and in front of the backdrop, and 3D props (e.g., electric lights that can be "lit" or activated when the trajectory of the stream of the second type of light passes over or near the props). All or some of the reflective elements may have low reflectivity such that they are nearly invisible to the audience until struck by the stream of the second type of light, and, to this end, the reflective elements may be formed of scrim, tulle (a netting-type fabric with many gaps or openings), or other woven/mesh and/or lower reflectivity materials (e.g., less than about 6 to 10 percent reflectivity).

It was recognized that the two types of light that could be blended in a display system to create desirable visual effects could be coherent light (use a pair of scanning lasers for one 3D light source assembly (e.g., a pair of WMV light sources) to provide light with spatial coherence that creates focus of light at any point perceivable by a viewer's left eye and a viewer's right eye via 3D glasses) and light from a 3D projector (e.g., a conventional 3D video projector or projectors that may be configured to suit a particular WMV technology). In some cases, all waves within the laser light are in phase and in step with each other and do not interfere with one another over a spatial distance. Laser projection may be used to produce volumetric visual effects (e.g., 3D content) that appear to occur in space on or off a screen or object at which the light is aimed. Examples include star fields, pixie dust, and fireworks. Hence, laser-produced light or media may be thought of as "point-based" or "particle-based" media (note, this includes particles of vector as it can be lines, too) to differentiate it from "pixel-based" media or light emitted from common 3D projectors. Pixel-based projections are optically focused on a projection surface and are characteristically low contrast and low brightness compared to particle-based projections from scanning lasers or projectors. Contrast and brightness in a display are the results of the two types of light (pixels and points do not influence these aspects of the produced display).

Further, it was recognized that the projected, particle-based images (from the pair of scanning lasers tuned to provide coherent light in one of two narrow ranges or narrowband light) can be created or generated by drawing or rastering the laser to form "3D shapes" where the laser scans over a predetermined area and shape for a time sufficient to register an image in the viewer's left and right eyes and then the laser moves on to paint another rastered image at another location. The laser can be aimed at nearly any surface in a display space or environment (a display volume) such as a projection screen, props and set pieces, walls, the ceiling, and/or scrim or similar materials placed in the display space or volume. Unlike pixel-based media, the particle-based media forms an image anywhere in the volume without needing to be refocused. Because the laser presents an effect of a nearly infinite focal length, the spot of light and images drawn with the spot of light appear in focus throughout the volume of the display space. Current laser projection equipment moves the laser light by physically moving the direction of the emitter, using mirrors and the like, which produces discrete visible light effects by blanking the beam or masking the beam while it transits over a trajectory or path from one target to the next (from a first canvas to a second canvas of a 3D display). Although each scanning laser is only projecting a single beam of light that can be perceived by one of the viewer's eyes via 3D glasses, current laser projectors can move the beam fast enough to produce many discreet images that appear to a human observer or viewer to be presented or projected at the same time.

The volumetric or 3D display systems discussed herein can provide integrated overlays of two types of light from two different media or light sources. In one display system, a pair of scanning lasers project a layer of coherent light upon a layer of light (non-coherent light) projected from a 3D video projector (e.g., a WMV projector). The two light sources are controlled to interact with each other to blend the two layers of light and then to separate the two layers and provide the coherent light on a second canvas that may optionally include volume with two or more layers of scrim, tulle, or other elements that reflect portions of the coherent light to a viewer.

The present description relates to a method of creating shows that have conventional pixel-based projected media (e.g., WMV-based 3D media) presented in a coordinated, coherent manner with a particle-based (e.g., laser) projection. The particle effects are "coordinated" with the pixel-based projected media in the sense that timing, position, and/or color characteristics allow the viewer of the two blended media (or two blended light-type layers) to perceive the particle effects as part of the pixel-based presentation during at least a subset of the timeline of the overall presentation or display and then to jump off (or jump onto) the screen where the pixel-based media is displayed into a nearby space or volume during other portions of the timeline. Pixel-based 3D projection alone cannot achieve this selective blending and separation of two layers of projected light onto two or more canvases/projection surfaces, and the effect has proven to be quite effective in pleasing and surprising viewers of the 3D display or integrated volumetric light display. Further, the description teaches a method and/or protocol (and corresponding system) for authoring or creating media that has laser-provided 3D and, optionally, volumetric components (e.g., the scanning laser light that can jump to a 3D set or second canvas) and projector-provided 3D components (e.g., 3D video projected onto a planar projection screen or first canvas) that can later be displayed in a coordinated and blended fashion.

Figure 2:
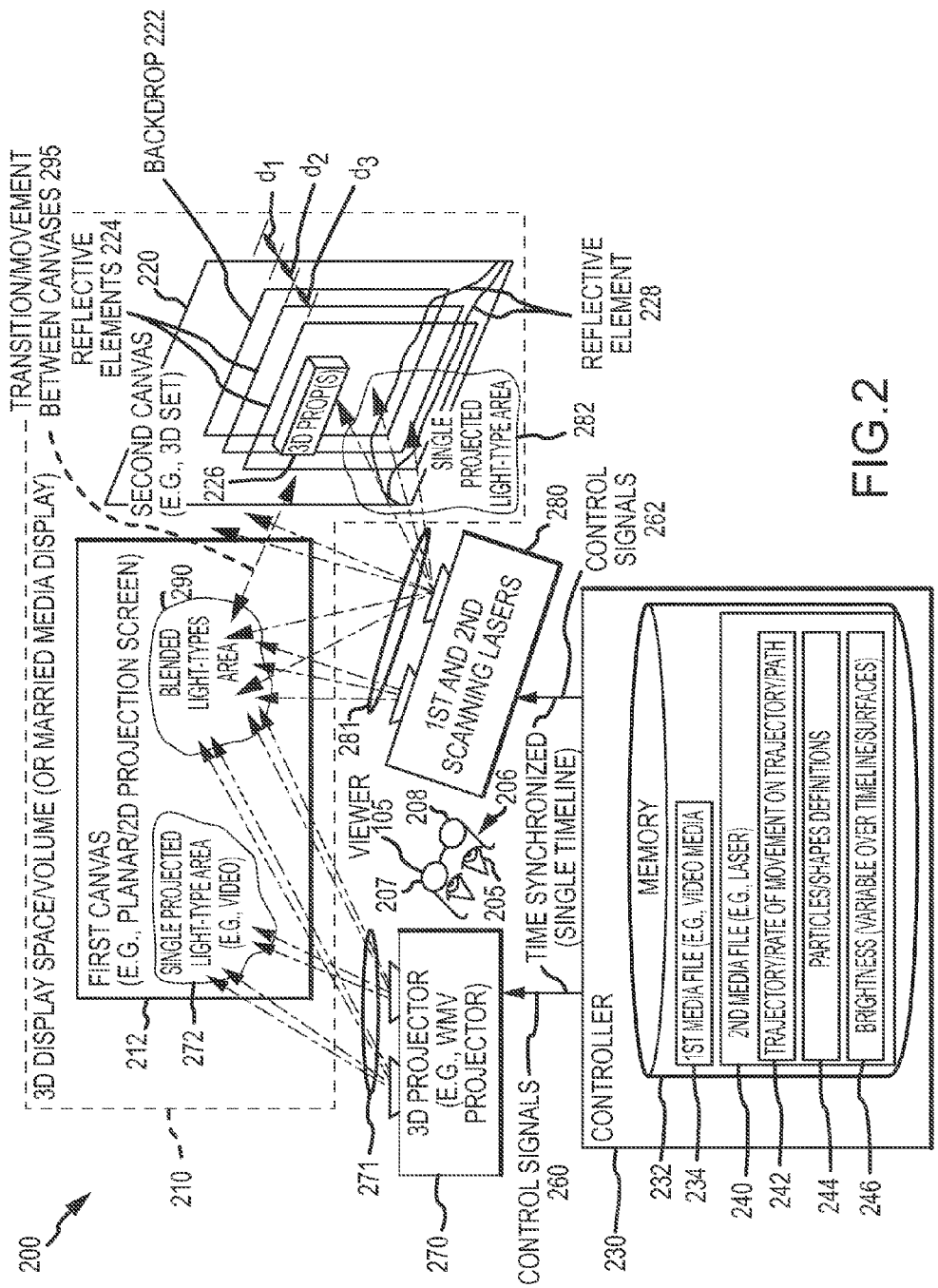
FIG. 2 illustrates a functional block diagram of another exemplary 3D display system operating to provide two layers of light with different qualities and the layers can be selectively blended and separated to be provided on one canvas or on multiple canvases (e.g., jump off a projection screen onto a second projection screen and/or 3D set)

FIG. 2 illustrates a volumetric or 3D display system 200 that can be operated to provide a viewer 205 a volumetric display when the viewer wears 3D glasses 206 with first and second (or left and right eye) lenses 207, 208 adapted for filtering first and second types of light (e.g., first light having a frequency falling in a first WMV range of wavelengths and second light having a frequency falling in a second WMV range of wavelengths such as found in a pair of WMV glasses suited for Dolby 3D projectors, for Christie 6P projectors, or other useful WMV projectors). The volumetric display blends or mixes two types of light to create a unique effect. To this end, the system 200 includes a 3D display space or volume (or a married media display) 210 that includes a first canvas 212 and a second canvas 220. The first canvas 212 may be used to provide a planar (or substantially so) surface for displaying two dimensional or 3D objects or images as shown at 272 and 290. The first canvas 212 may take many forms such as a wall or a projection screen (rear or front projection screen).

The second canvas 220 is arranged to provide one or more surfaces that extend outward from or are spaced apart from the projection surface of the first canvas 212. In this way, light or imagery can be projected on the first canvas 212 and the second canvas 220 and moved between the two canvases 212, 220 as shown with arrow 295 showing light transitioning from a blended light area 290 on the first canvas 212 to a single type of light area 282 on the second canvas 220.

The second canvas 220 may be planar as with the first canvas 212, but, in many applications, it is desirable to provide a 3D set with the second canvas 220 that has volume (e.g., displays reflected light at two or more distances relative to the viewer 205). To provide volume, the canvas 220 may include a backdrop or screen element 222 which may be relatively highly reflective (solid but dark in some cases). Then, one, two, or more reflective elements 224 may be provided that are spaced apart from the backdrop 222 at a first distance, $d_1$, and from each other at a second distance, $d_2$. Often, it will be useful to disguise the presence of the elements 224, and scrim, tulle, or other lower reflectivity material (e.g., material with reflectivity less than about 20 percent, less than about 10 percent, or less than about 6 percent) may be used in some implementations of canvas 220. In one implementation, scrim or tulle sheets are hung in front of the backdrop 222 to provide volume for a projected image/light 281.

The canvas or 3D set 220 may also include physical or 3D props 226 that may act to further the impression that the canvas 220 has volume to the viewer 205. For example, 3D props 226 such as candles and lights may be used that are activated, lit, or illuminated when the light 281 has a trajectory that causes it to flow onto or near the objects 226. The canvas 220 may also include 3D reflective elements 228 in front of the reflective elements 224 a distance, $d_3$ (or behind or sandwiched between the elements 224 and props 226). For example, one or more sheets of scrim, tulle, or other mesh/woven material may be rolled, compressed, or otherwise arranged to present a body or multiple layers of the mesh/woven material for reflecting the light 281 (e.g., provide a higher density of material for reflecting the light 281 than a single sheet of material as may be used for reflective elements 224). In one embodiment, the 3D reflective element 228 was placed at a lower level than the elements 224 such that a gravity or falling effect can be provided for the projected imagery 282 as particles "fall" from surfaces of reflective elements 224 onto the reflective element 228 based on a trajectory or path defined for the light 281 (e.g., fireworks explode on elements 224 and embers fall down onto the reflective element 228).

The projection materials that may be used for the first and second canvases 212, 220 may take a variety of forms. The canvases 212, 220 may be chosen to provide solid projection surfaces such as those provided by traditional projection screens, walls, ceilings, floors, architectural features, rocks, trees, ground, and other outdoor or indoor objects. In some cases, it may be useful to use semi-transparent projection surfaces for one or both of the canvases 212, 220 such as water curtains, water spray (e.g., from fountains), steam, liquid nitrogen clouds, smoke, and transparent projection screens. In other cases, it may be useful to use transparent (or nearly invisible) projection screens such as for the second canvas 220 and its reflective elements 224, 228. Perforated surfaces may be used to provide nearly invisible (in lower light) projection surfaces such as with use of scrims, chiffons, tulles, hardware cloths, expanded metals/meshes/screens, and with diverse natural or manufactured materials (e.g., the second canvas 220 may include tree/bush leaves and branches, grass, foliage, and the like).

The display system 200 further includes a source 270 of a first type of light 271 (e.g., non-coherent light such as may be provided by some WMV projectors) and a source 280 of a second type of light 281. The second type of light 281 is two streams or beams of coherent light, and, in some cases, the source 280 may be a pair of monochromatic (red, green, or blue) scanning lasers or a pair of full RGB scanning lasers. As discussed with regard to the system 100 of FIG. 1, the pair of scanning lasers are tuned or adapted to provide the light 281 such that it includes a beam/stream of light with a wavelength falling within a first range of wavelengths that can be passed through a first lens of 3D stereo glasses (e.g., a left lens 207 of WMV glasses 206) and a beam/stream of light with a wavelength falling in a second range (differing from the first range) of wavelengths that can be passed through a second lens of 3D stereo glasses (e.g., a right lens 208 of WMV glasses 206). The two scanning lasers of source 280 are operated/controlled in a synchronized manner with each other to project 3D content such as to provide particular objects or shapes such as to provide imagery, e.g., 3D content that appears to be fireworks, streaking stars, pixie dust, and other images suited for providing with particle-based media.

The display system 200 includes a controller 230 (such as a computer with a processor and operating system that runs/executes code or computer programs to perform functions as discussed herein and that may be provided in computer-readable media). The controller 230 operates to issue control signals 260, 262 to operate the first and second light-type sources 270, 280 in a manner that is time synchronized. In practice, the light 271, 281 is projected following a single timeline such that projected light/imagery is coordinated to provide interaction and blending of the projected light 271, 281 via the canvases 212, 220.

The controller 230 has or can access memory 232 that stores a first media file 234 and a second media file 240. The first media file 234 may provide video content (e.g., an animated film/clip in digital format) that is used by the controller 230 to generate the control signals 260 to operate the 3D source/video projector 270 to project the light 271 (e.g., left and right eye imagery according to a particular WMV technology) onto the first canvas (e.g., 3D projection screen or other projection surface) 212. In other cases, the control signals 260 are used to provide synchronized playback of the media file 234 that has previously been stored on 270 or fed to the projector 270 for playback (in a wired or wireless manner). The light 271 may be provided alone or in isolation on the canvas 212 as shown at 272 with an area of a single projected light type or in a blended or interactive manner with the light of a second type 281 as shown in area 290 (blended light types area) on the surface of the first canvas 212 (e.g., a fairy's wand may emanate pixie dust that is provided by a blending of video light 271 and laser light 281 in area 290).

The second media file 240 is used by the controller 230 to generate the control signals 262 to cause the second light-type source 280 (e.g., a pair of scanning lasers) to output or project the light (e.g., two beams of laser light with two differing wavelengths matching a WMV prescription for left and right eye light) 281. The light 281 may be projected onto the first canvas 212 such as to be blended with or provide a second layer of light with the light 271 as shown in the blended light-types area 290 on the first canvas 212. The light 281 may be moved along a trajectory over the surface of the first canvas 212 and may be moved by operation of the laser projectors or laser scanners 280 to jump off the surface of the first canvas 212 onto the second canvas 220 as shown with arrow 295 showing a transition or movement between canvases 212, 220. When directed toward the second canvas 220, the light 281 may be mapped to and moved over a single light-type area 282 for selective reflection off of the surfaces of the second canvas 220 defined or provided by backdrop 222, reflective elements 224, 3D props 226, and 3D reflective element 228 to provide a volumetric display perceivable by a viewer 205 via the lenses 207, 208 of their 3D glasses 206 (e.g., WMV glasses).

The second media file 240 may store data to define a variety of parameters for the light 281 that can be used by the controller 230 for generating the control signals 262 to operate the laser projector or second light-type source 280. For example, the second or laser media file 240 may store data 242 defining the trajectory or path for the light 281 in the 3D display space 210 and the rate(s) for movement over this trajectory/path. The two beams of the scanning lasers of source 280 may be spaced apart the intraocular distance in some cases to provide a 3D effect. Further, the media file 240 may store data 244 defining the objects/shapes of elements to be provided by the particle-based light 281 on the canvases 212, 220. Further, data 246 may be provided in the media file 240 that defines a number of other features of the light 281 that may be held constant throughout operation of the display system 200 or that may be varied over the timeline used for control signals 260, 262. The parameters defined by data 246 may include brightness of the particles of light 281, which may be provided at a first level of brightness in area 290 (a relatively low luminosity to blend with brightness of light 271 in area 290 such as a brightness that is less than the brightness of light 271) and at a second level of brightness in area 282 (a higher luminosity than in area 290). The data 246 may also define the color of light 281 provide by the projector 280, which may be fixed for a media file 240 or be varied over time (e.g., when the source 280 is a full RGB scanning laser projector).

Figure 3A:
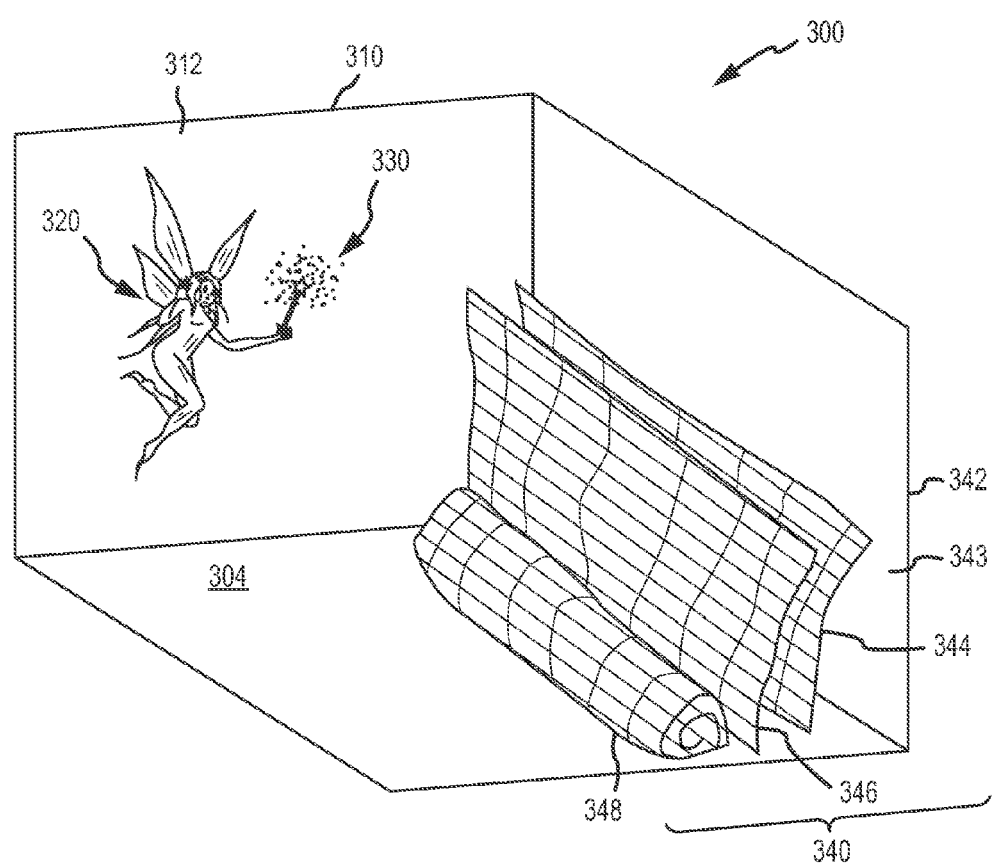
FIGS. 3A-3C illustrate a volumetric or 3D display system, such as the system of FIG. 2, during operation at three points in time along a timeline or during a period of operation where two layers of two different types of light are blended and interact to provide a volumetric or 3D display.
Figure 3B:
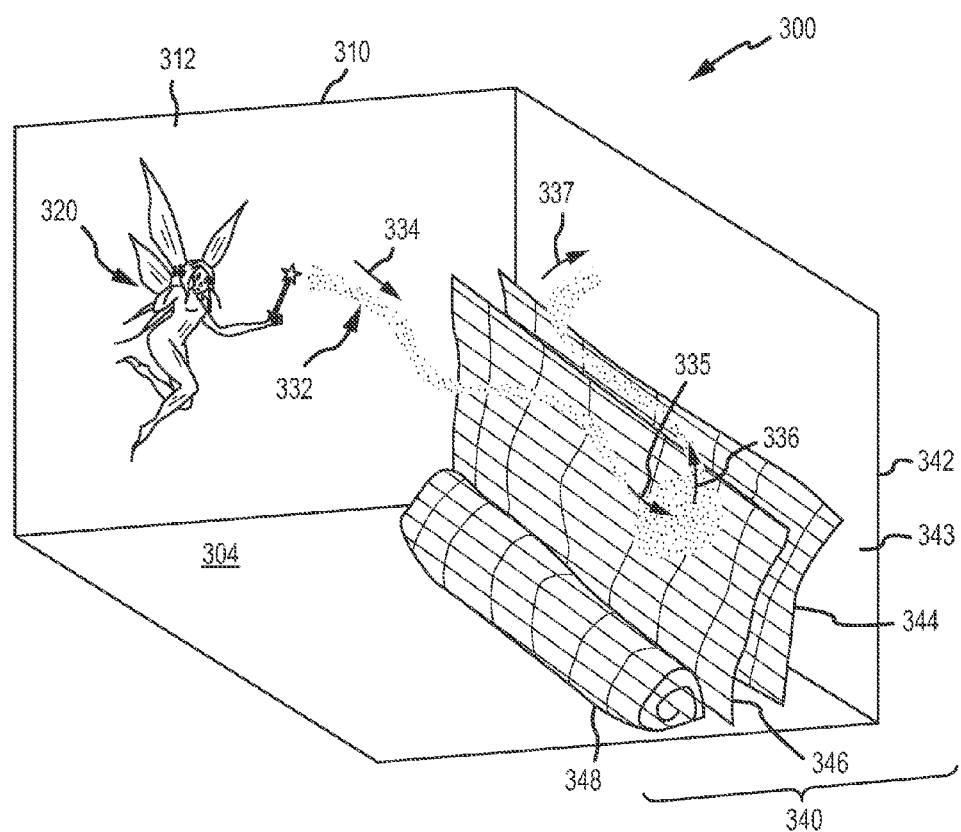
Figure 3C:
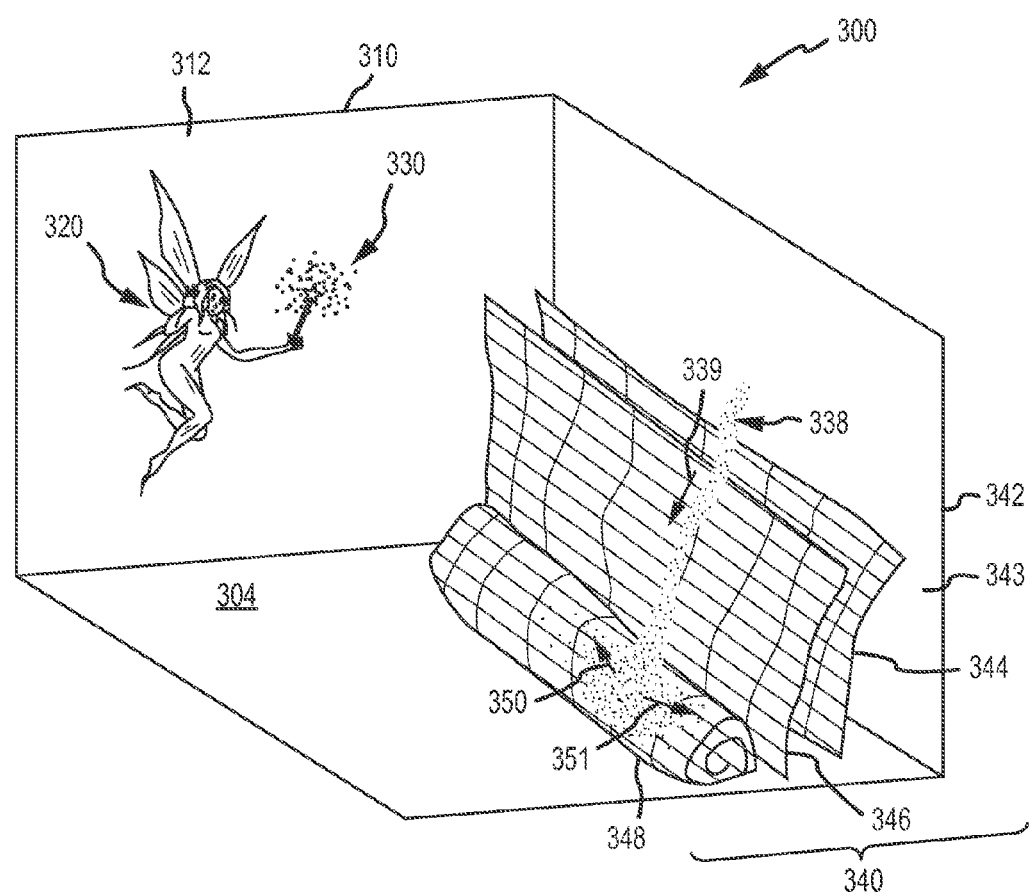

FIGS. 3A-3C show a volumetric or 3D display system 300 during three states of operation or at three points along a control timeline. The 3D display system 300 may take the form shown for system 200 of FIG. 2. FIGS. 3A-3C illustrate what a viewer or observer (not shown) wearing 3D glasses (e.g., Dolby 3D, Christie 6P, or other WMV glasses suited to the output light from a WMV projector and pair of scanning lasers) may observe during operation of two (or more) light sources (not shown but may take the form of sources 270 and 280 shown in FIG. 2 for system 200) to provide two types of light such as light from a 3D projector (e.g., light in one of two narrowbands) and light from a laser projector assembly (e.g., coherent light in first and second ranges of wavelengths for a WMV technology from first and second scanning lasers).

The display system 300 includes a first canvas or projection screen 310 that provides projection surface 312. The first canvas 310 may take the form of a wall or a conventional projection screen. The display system 300 includes a second canvas or 3D set 340. The 3D set 340 is formed of a backdrop or screen 342 providing second surface 343, and the backdrop 342 may be a wall, a projection screen, a curtain, or the like. The 3D set 340 is not planar in most cases and includes reflective elements 344, 346 spaced apart from surface 343 some distances. The reflective elements 344, 346 may be provided by sheets of tulle, scrim, or other lower reflectivity material that may be chosen to be nearly invisible to a viewer until illuminated by one of the light sources of system 300 (such as with a pair of laser projectors or scanning lasers). A non-planar or volumetric reflective element 348 may be positioned on or near the ground/floor 304 in front of the reflective elements 344, 346 and the backdrop/screen 342, and this element 348 may be formed of one or more sheets of scrim, tulle, or the like but be arranged to provide multiple layers of mesh material (e.g., a sheet of scrim or tulle folded upon itself or simply a wrinkled or non-planar sheet of tulle or scrim placed on the floor 304).

FIG. 3A illustrates the display system 300 at a first time along an operational or control timeline or first operating state for a projection system (a pair of scanning lasers and a WMV 3D projector). As shown, a WMV 3D projector is being used to project light to provide a projected 3D object or content 320 on the surface 312 that is provided by a first type of light. The content chosen in this example for object or displayed imagery 320 is a flying fairy or magical character that may fly or move about the surface 312 and in the 3D space in front of or behind the surface 312. Concurrently, a pair of laser scanners is being used to project light to provide a projected object or content 330 on the surface that is provided by a second type of light (e.g., two beams of differing wavelength laser light rather than non-coherent or coherent light that may be used to provide imagery 320).

The projected object or content 330 is mapped to the location of the object 320, and, in this example, the content of the media file used to control/operate the pair of scanning lasers is chosen such that the projected object 330 takes the form of a cloud of pixie or magical dust floating about the end of a wand of object or video imagery 320. When viewed through 3D glasses, the 3D content or projected object 330 appears to float in front of, on, or behind the surface 312 to the viewer and its 3D location can be matched to or correspond with the 3D position of the 3D object 320 (or its wand). When the wand/object 320 is moved on or relative to the surface 312, the pixie dust/object 330 moves, too, in 3D space in a corresponding manner to remain blended with (or layered over, on, or under) the video imagery of object 320. The illumination levels of the two sources providing objects 320, 330 may be controlled to match so that the 3D objects 320, 330 appear to be provided or projected by a single source. In the first point of time or operating state of FIG. 3A, no light is projected onto the 3D set or second canvas such that much of this set may be hidden from view or hard to detect by a viewer (such as elements 344, 346, 348).

FIG. 3B shows the volumetric display system 300 at a second point in time on the timeline or a second operating state. At this point on the control or synchronization timeline used by a controller, the 3D video content/object 320 continues to be projected upon the projection surface 312 (e.g., by operation of a 3D projector and the object 320 may be animated and fly about the surface 312) to appear to be on, behind, or in front of the surface 212.

Further, though, the 3D object/content provided by the other projector or light source (e.g., the two scanning lasers tuned for the WMV technology of the 3D projector providing 3D content 220) has changed as shown at 332 so that it is moving away from the object 320. The trajectory/path and movement of the 3D content/object 332 is shown with arrow 334 (to move upon, behind, or in front of the surface 312), with arrow 335 to move onto and over areas of the reflective element 346, with arrow 336 to move onto and over areas of the reflective element 344 (or some distance in front of or behind element 344), and with arrow 337 to move onto and over areas on the surface 343 of the backdrop or screen 342 (or some distance in front of or behind surface 343). The rate of this movement may vary over a large range to achieve a desired effect as may the shape of the 3D stream 332 and of the objects/shapes of elements provided within the 3D stream 332 (e.g., to achieve a 3D stream or volumetric cloud of moving pixie dust versus shooting sparks from fireworks or an explosion or to achieve a different effect). The projected 3D object/content 332 may be provided with a pair of scanning lasers and be visible, through proper 3D glasses, due to reflection of this coherent light off the surface 312 of the projection screen 310 as well as surfaces (e.g., tulle, scrim, or other surfaces) of the elements 344 and 346 and surface 343 of backdrop 342. In this manner, the already 3D imagery is provided additional volume as it transitions or jumps from the planar surface 312 to the surfaces of the 3D set or second canvas 340.

FIG. 3C shows the volumetric display system 300 at a third point in time on the timeline or a third operating state. At this point on the control or synchronization timeline used by a controller to control projection, the 3D video content/object 320 continues to be projected upon (or in front of or behind) the projection surface 312 (e.g., by operation of a WMV or other 3D projector and the 3D object 320 may be animated and fly about or in space in front of or behind the surface 312).

Further, though, the content provided by the pair of scanning lasers (or source of the second type of WMV light) has changed again as shown with projected 3D content 338. In this example, the volumetric cloud or stream of pixie dust provided by numerous bright particles (e.g., small circles or stars or other shapes) is streaming down or falling (as if due to gravity after striking surfaces on the 3D set 340). As shown with arrow 339, the stream of dust or projected object/content provided by the laser light (or second type of light) is reflected from surfaces of backdrop 342 then from surfaces of reflective element 344 then from surfaces of reflective element 346. Then, as shown with arrows 350, 351, the projected 3D content 338 is selected so as to or adapted to give the appearance the pixie dust or sparks bounce off the ground 304 with the trajectory of the stream/cloud 338 in the space near the ground 304 abruptly changing direction back upward or away from the ground 304 on or in the space near the reflective element 348.

An observer or viewer may not be able to see the elements 344, 346, 348 themselves but only the projected 3D content which is particle-based (e.g., small volumetric shapes provide by beams from two scanning lasers). Hence, the viewer sees or perceives what appears to be a volumetric or 3D cloud of pixie dust or sparkling particles floating or flying through the air off of the screen 312 to a space/volume adjacent the surface, striking the wall/surface 342, falling toward the ground 304, and then bouncing off of and later settling onto or in the space near the ground 304.

Figure 4:
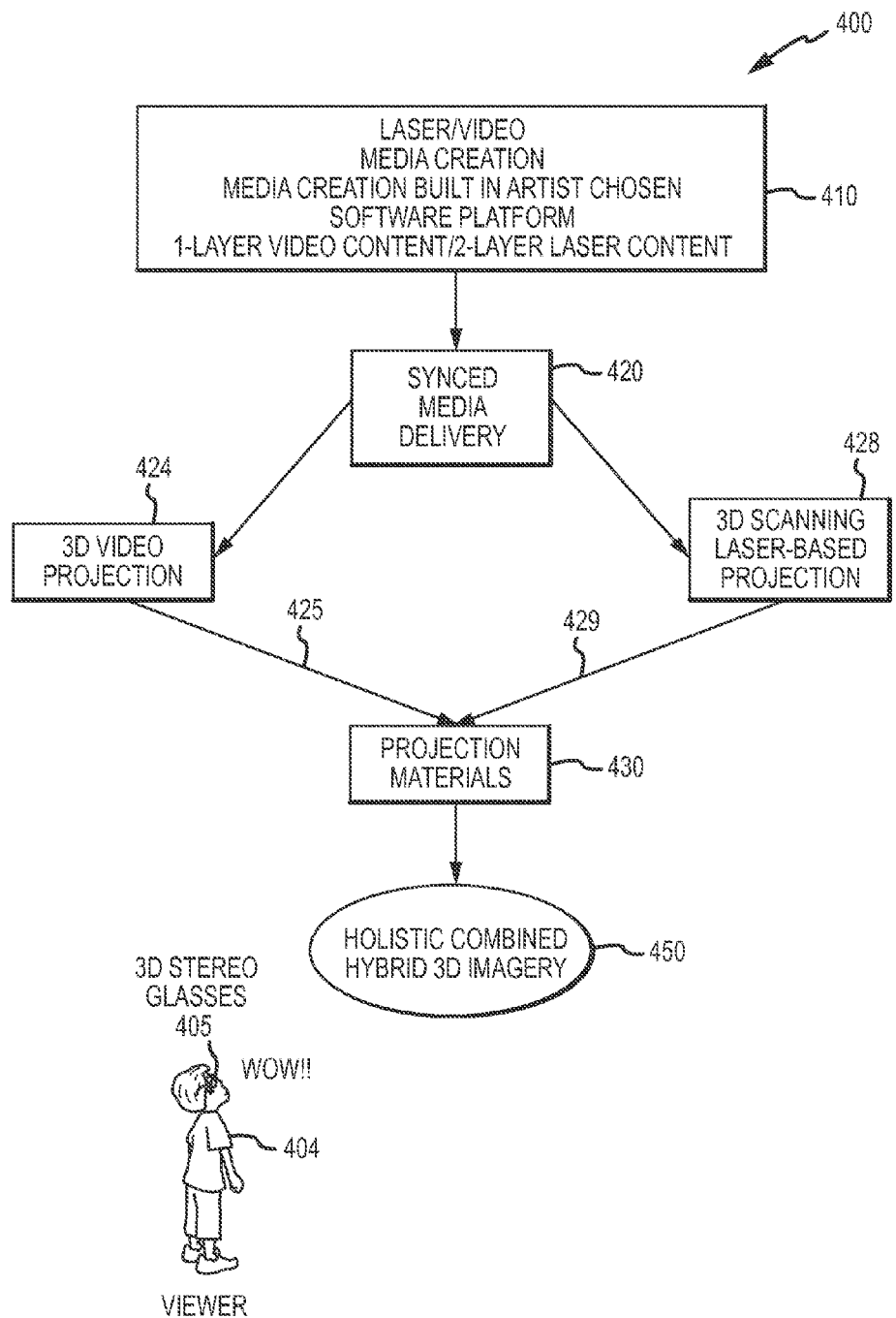
FIG. 4 is a flow diagram of the method of integrating two types of volumetric or 3D projections or media to provide a unique volumetric or 3D display to a viewer.

FIG. 4 is a flow diagram of a method 400 of integrating 3D projections or media from a 3D projector and from a pair of scanning lasers to provide a unique volumetric or 3D display 450 to a viewer 404 wearing 3D stereo glasses 405 (e.g., WMV glasses). At step 410, the laser and 3D video content files are created and stored in memory (e.g., memory 232 used to store media files 234, 240). At step 420, a controller operates to synchronize the delivery of the two types of media to a device or system used for video projection and to a device or system used to provide scanner laser-based 3D projection. Step 420 may be considered a controlled operating loop in which the two different types of media are presented to a viewer 404 as shown at 450 such that the corresponding frames of each file created at step 410 are concurrently projected to provide proper blending and interaction of the video imagery (first type of light) and the particle-based imagery from a pair of scanning lasers (second type of light is the laser light).

Video or 3D projection proceeds at 424 to provide or project a first stream of light 425 onto a set of projection materials 430 such as upon a planar portion or element (e.g., a 3D projection screen, a wall, or the like). Laser projection proceeds concurrently (along the same timeline as used for 3D projection 424) at 428 to provide or project a second stream of light 429 onto the set of projection materials 430 such as with overlap on the planar portion or element(s) used to display the video imagery and/or with separate display on a separate planar portion or on components used to provide a 3D set nearby to the planar portion(s). The result of the projection 424, 428 of the two types of light 425, 429 onto the projection materials 430 is a display to a viewer 404 wearing 3D glasses 405 of a holistic, combined 3D imagery 450 that is a hybrid of two types of light or two types of 3D content/media, e.g., non-coherent light with coherent (or scanning laser) light on the same and differing portions of the projection materials.

With regard to the 3D projection 424, a 3D or WMV projector such as a Dolby 3D projector, a Christie 6P, or other WMV technology-based projector may be used to project the 3D video file contents onto a planar portion or element of the projection materials 430 to provide a first set of volumetric or 3D projections/images visible by the viewer 404 via 3D glasses 405 as part of the hybrid 3D imagery 450. 3D video projection 424 is advantageous for use in providing the imagery 450 because it is raster based and because a 3D projector is able to produce many complex images over a very large physical area within a single frame without taxing the projector system or causing flicker.

However, by itself, 3D video projection 424 is also disadvantageous due to the following issues: (a) the ability of an image to be in focus on a given surface is dictated by the focal length of the projector with a given lens; (b) color, contrast, and brightness are limited in a lamp projector compared to a laser projector; (c) materials and surfaces for use in projection surfaces 430 are limited because solid, lighter colored surfaces produce much brighter imagery and as the surface becomes more open or perforated (e.g., scrim or tulle) the projected image begins to quickly decrease in quality due to loss of brightness, contrast, and depth of color; (d) video projection image quality is greatly affected by the quality of the surface on which it is projected with front projected video image quality being the best when it is reflected off solid and lightly colored surfaces; (e) lamp video projectors are very inefficient with respect to the amount of light produced by the lamp versus the light that ends up on the projected surface; (f) video projection requires certain ambient light levels to produce quality imagery; and (g) lamp projectors have a technical limitation to the amount of light they can produce. Due to limitation (d), while scrims can be projected upon with video projection/light, scrims and similar materials do not reflect imagery with as high of quality as a planar surface due to the limited amount of power of the light produced at the surface of the scrim per pixel. Contrast, brightness, and color saturation are lost on even the tightest pitched scrims. Because of these losses, using volumetric techniques through the use of tulles and scrims has limitations with video projection, and the faint quality of imagery produces ghostly, washed-out images that need low ambient lighting levels to even be seen or perceived by a viewer.

With regard to the scanning laser-based projection 428, a pair of scanning lasers (such as a pair of monochromatic or RGB scanning lasers) is used to project the laser file contents onto the planar portion or element with the 3D video stream 425 and, optionally, also upon one or more other portions or elements of the projection materials 430 to provide volumetric projections/images visible by the viewer 404 with 3D glasses 405 as part of the hybrid 3D imagery 450. Scanning laser-based projection 428 is advantageous for use in providing the imagery 450 for at least the following reasons: (a) laser projection has enormous and scalable levels of power and brightness; (b) laser projection has high color saturation and a wide color gamut; (c) laser projection has useful contrast ratios; (d) imagery provide by laser projection always appears to be "in focus" at any distance near or far due to the fact that scanning laser projectors output highly coherent light; (e) laser imagery reflects well on solid surface materials such as a planar projection screen and on open surface materials (e.g., scrims, tulles, meshes, and the like) because of the very high brightness levels that can be provided by laser projectors; and (f) the ability to reflect quality images from perforated or porous materials such as scrims and tulles allows for volumetric techniques and methods to be done very effectively without ghosting or unacceptable loss of image quality.

However, by itself, laser projection 428 may also be disadvantageous for a number of reasons. Laser projectors are vector based (not raster based as the case with video projectors) and cannot produce the amount of complex imagery over a large surface as can video projectors. Laser projectors are limited to a given amount of points or lines that can be drawn over a given surface in a given time. This is due to the limited physical speed at which the galvanic scanning mirrors can move and the speed at which the RGB lasers can be turned on and off. Both of these functions create debilitating heat to the system that has to be managed. There are many visual artifacts that are revealed when surpassing the particle budget including flicker. Laser light can have speckle, and this can be good or bad with regard to a displayed image 450 depending upon the desired outcome of the look of a light-based display.

With regard to the projection materials and surfaces 430, special effect techniques and methods may be used to produce volumetric imagery with these two types of light streams 425, 429. By strategic placement of specific projection materials that is coordinated with the blending of laser and video projected media 425, 429 on these given surface, the method 400 can be used to produce compelling looks and volumetric experiences. For example, the 3D projections 425 may be projected upon solid surfaces 430 (e.g., traditional 3D projection screens, walls, ceilings, floors, architectural features, rocks, trees, grounds, and indoor/outdoor solid surfaces available in a 3D display space/volume) or on semi-transparent surface 430 (e.g., water curtains, sprayed liquids and/or solids, steam, clouds (e.g., formed using liquid nitrogen), smoke, and transparent projection screens). The scanning laser-based 3D projections 429 may be projected on these same surfaces with the 3D video light stream 425 to blend the two light types and before and/or after such blending may be projected on other solid or semi-transparent surfaces and/or on perforated surfaces (e.g., scrims, chiffons, tulles, hardware cloths, expanded/meshed materials, foliage, and so on) arranged in a volumetric manner or in a 3D set.

At this point, it may be useful to provide further explanation of workflow or steps involved in creating the 3D laser media and 3D video media (which may be built in or formed in a software platform or digital format selected by a particular artist or display designer to support the synced media delivery 420 and projections 424, 428).

Combining laser media and video media creates a unique look that is more dynamic and exciting for a viewer or audience member. An example of this can be illustrated with something as simple as pixie dust. 3D video media is used to project a flying fairy against a background where she waves a wand and sends pixie dust swirling outward in a linear path. 3D laser particle projection supplements the projected 3D video by adding pixie dust as it swirls around in the scene. Step 410 includes creating the laser media file from the 3D video file (e.g., selecting components of the 3D video file to be provided with scanning laser-based 3D projection 428, creating the shapes, and mapping these shapes/particles to the 3D video components and their trajectories on the projection surface). Step 410 also involves balancing the laser light qualities of super brightness and saturation with the detailed video image to provide a unique look in the resulting media hybrid that is more dynamic and exciting to the viewers watching the hybrid 3D imagery 450.

The blending on a planar projection surface in the materials 430 can be expanded upon by splitting the 3D laser light and 3D projector light at a location on the projection surface 430 where the laser projection jumps off the screen 430 on to a series of scrims or other projection components 430 arranged in a 3D set to create an added volumetric dimensional look in the already 3D hybrid imagery 450 for the viewer 404 wearing WMV glasses 405.

Designing each format (or content provided by two differing light types) as well as synchronizing the two is an important step 410 in order to effectively create this unique and more dynamic look in 3D imagery 450. When designing media for both 3D video and laser projection 424, 428, one should take into account the limitations for both mediums. In the above example, the 3D video media may be used to provide a significant percentage or fraction (e.g., 70 to 90 percent or more) of the overall 3D image due to its wider range of detail and color. However, 3D video is limited to the type of 3D projector and to the type of screen surface used in regards to luminance and contrast, which can make the image feel dull and flat.

3D laser particle projection has a high luminance and contrast output. Step 410 may involve choosing to accent the 3D video projection 424 with the 3D laser projection 428 (e.g., with the remaining 10 to 30 percent of the image) to provide 425, 429 a resulting 3D image (100 percent of the image) 450 that becomes more dynamic for the viewer 404. By taking advantage of the brightness of the two scanning lasers, one can project 429 on surfaces 430, such as a series of scrims, to create a unique volumetric dimensional effect (e.g., 3D content projection upon a 3D set/surface). This is a good example where 3D video media would fail to provide an effective look due to its limitation as mentioned above. However, the scanning laser is limited to particle volume and the speed of the animation that can result in laser blanking which appears to the naked eye as flickering light. Laser light sometimes cannot provide the detail image that 3D video can provide. The best it can produce is a stroke outline of an object. Hence, step 410 involves a careful balance between both mediums including keeping their limitations in mind to produce a magical and exciting 3D experience/imagery 450.

Figure 5:
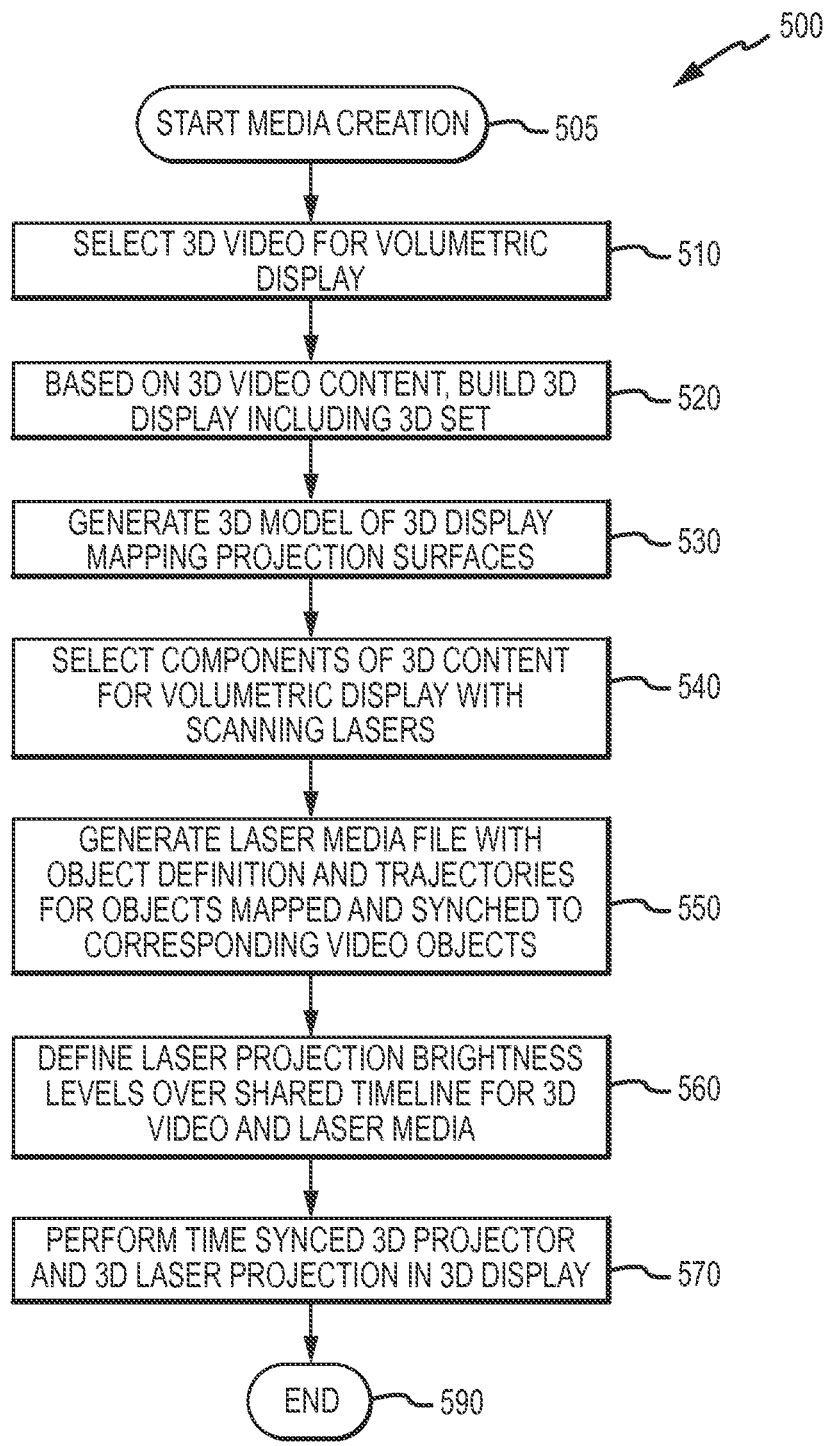
FIG. 5 is a flow diagram of a method of creating (and then projecting) media for integrating 3D projector outputs and scanning laser-based 3D projections to provide a unique hybrid 3D image.

FIG. 5 is a flow diagram of a method 500 of creating (and then projecting) media for integrating 3D projections from a 3D projector and from a pair of scanning lasers to provide a unique hybrid 3D image. The method 500 starts at 505 such as by choosing a space or location for providing a 3D display space and choosing one or more 3D video projectors for use in projecting the 3D video portion of the media and two or more scanning lasers for use in projecting the 3D laser portion (coherent light) of the 3D media. Step 505 may also involve choosing a controller for operating the 3D projectors and scanning lasers in a time synchronized manner (project corresponding frames of each of the 3D media files along a shared or single timeline) such as with an integrated control loop.

The method 500 continues at 510 with selecting a 3D video for use in the 3D display space or volume. For example, an animated film or clip may be chosen that includes one or more animated characters or objects presented in one or more scenes. At step 520, the method 500 includes building a 3D display with a plurality of projection surfaces and/or materials. The 3D display typically will include at least one planar 3D projection surface such as one provided by a wall or a conventional projection screen. A 3D projector(s) (e.g., a conventional WMV projector) may be focused for projection upon this 3D or planar projection surface using the 3D video or content chosen at step 510. The 3D display also will be built to include one or more additional projection surfaces such as a plurality of reflective elements/surfaces in a 3D set positioned adjacent the planar projection surface used to display the projector-based 3D imagery. The 3D set may include one or more sheets or layers of scrim, tulle, or other low reflectivity (less than about 20 percent and more typically less than about 10 percent) and/or perforated materials that are spaced apart to provide layers or depths of reflective points for laser light. Additionally, 3D props and backdrop materials may be included to reflect the scanning laser light to a viewer wearing 3D glasses or to otherwise create a volumetric effect. In some cases, the trajectories for 3D and, in some portions of the set, volumetric images to be provided by scanning laser light is first determined, and these trajectories are used to selectively position the reflective elements/projection surfaces in the 3D set.

At step 530, the method 500 includes generating a 3D model of the 3D display and its projection surfaces, and this model or mapping data may be stored in memory/data storage for use in later steps (e.g., trajectory defining). This step 530 typically involves defining physical locations or coordinates of each projection surface in three-dimensional space. The method 500 continues at 540 with selecting one or more of the components or objects of the 3D content (video format file used to provide projector-provided 3D images) for use in generating 3D and volumetric images that can move off of the planar projection surface. In the above examples, an artist or display designer may select magical or pixie dust for use as the volumetric images. In another example, fireworks or the sparks/light associated with fireworks may be chosen at step 540. In another case, the 3D video content may involve an object or objects that generate sparks, and the stream of sparks (fire embers) may be chosen at step 540 for use in creating a 3D volumetric image.

With this selection made, the method 500 continues at step 550 with the generating of a laser media file (e.g., an IDLA file that is scan based) based on this selected 3D object(s) or image. Step 550 typically involves choosing 3D shapes/objects (and numbers, size, and density of such shapes/objects) that can be created with laser light or particle-based projection from a pair of scanning lasers to represent or generate 3D imagery that matches, imitates, or accents the 3D images. A color (or colors) is chosen for the volumetric images to define how the scanning lasers will be operated during later projection steps. Then, using the 3D model of the 3D display space including the planar projection surface and the 3D set with its reflective elements or projection materials, step 550 also includes defining trajectories and rate(s) of movement of the 3D shapes/objects along such trajectories/paths. For example, the 3D shapes/objects may be a plurality of small stars, and the stars may be held stationary for a first period of time to float over a 3D object displayed (with a WMV or other 3D projector) on a planar projection surface and then caused to move away from the projector-based 3D object and off of the planar projection surface and over reflective elements in the 3D set in a predefined pattern and at a predefined rate. The trajectories/paths are chosen to correspond with the locations/coordinates in the 3D display space of the projection materials (or reflective elements). Step 550 may involve use of an automated raster-to-vector converter or generator program or may be performed manually by an artist or technician.

At step 560, the method 500 includes defining laser projection brightness levels over the shared timeline for video and laser media. Typically, the 3D video projector(s) will have a fixed brightness (e.g., a lumen rating for a WMV projector (e.g., a Dolby 3D projector or the like)). The illumination level of the two scanning lasers generally is set relatively low (well below maximum brightness/power outputs of the laser projector) during portions of the control timeline in which the laser light is targeted onto the 2D projection surface with the video projector's light. This helps blend the two different types of light being concurrently used to provide 3D images such that the laser light and the objects it is used to display do not overpower the lower brightness of the 3D projector's imagery.

However, the illumination or brightness levels of the laser media is typically significantly increased at the point in the timeline when the laser light jumps or moves off of a planar projection surface (or the point on the trajectory of the shapes/objects where the laser light jumps off the planar projection surface). This allows the laser light to appear to the viewer wearing the 3D glasses with the same (or higher or lower) brightness as when on the planar projection surface when it is reflected off of different projection materials such as perforated materials (scrims, tulle, chiffon, or the like). The laser media file is then stored in memory/date storage.

The method 500 continues at 570 with performing time-synchronized projection of the two types of 3D and, in the case of the content displayed by the scanning lasers, volumetric images in the 3D display built in step 520 (or another space). The projection by the two scanning lasers can be considered 3D and volumetric projection since the laser particle projection moves from a first planar projection surface where it provides a 3D image to one or more second projection surfaces to display the particles (shapes/objects) in a volume or 3D display space. The method 500 then ends at step 590 or may be repeated at step 510 to create new media or at step 570 to repeat display of the created media.

The display systems achieve 3D imagery by projecting two types of light that both provide 3D imagery to a wearer of 3D glasses but the light has different qualities. In some implementations, one type of light is non-coherent light from a 3D video projector and a second type of light is provided using a pair of scanning lasers so as to provide two beams/streams of coherent (or laser) light intended to reach the viewer's left and right eyes that is more intense (e.g., has higher luminosity) and is one color, in some cases such as when the scanning lasers are monochromatic, such that it "pops" off the projection screen and 3D set elements. The content or laser media used to operate the lasers is typically derived from video media such as a 3D movie or animated clip or the like. Hence, the description has concentrated on the workflow used to create the two media files used to concurrently control the two (or more) projectors used to project the two types of light or 3D media/content, with the frames of each being provided in a time-synchronized manner.

The 3D and volumetric effect is achieved in large part by providing a 3D set with reflection elements (or projection surface) that are non-planar with the first planar projection surface (that is used for the projection of the 3D video content with the 3D projector alone or in conjunction with the pair of scanning lasers). The laser light and its content/media are moved so that it "jumps" from the planar projection surface onto the 3D set components. When the laser light is on the planar projection surface with the light from the 3D video projector, the illumination levels of the lasers can be set at relatively low levels (e.g., within about 25 percent the illumination levels as the video light from the 3D video projector and often at lower levels than the 3D video projector). Then, when the laser light moves to the 3D set with its lower reflectivity (e.g., scrims and toules), the lasers can be operated to significantly increase their illumination levels such as to up to 2 to 4 (or more) times what was used on the planar projection surface. To the observer wearing the 3D glasses, this may be used to provide a display where there appears to be little to no drop off in the brightness or luminosity of the displayed 3D imagery even though light is being projected onto a mesh or low reflectivity surface (which may be nearly invisible to the observer prior to being projected upon with the laser projector as it may include ⅛-inch openings or the like and projection involves striking intersections of fabric threads/wires).

The coordination and integration of the two projected light types is very high and often includes projecting the two types of light onto a single surface to display a single image or object (e.g., a cloud of pixie dust, fire, sparks, fireworks, and so on may be provided at least for a portion of the display using both types of light projectors prior to a division onto separate projection surfaces). The particle-based laser projection is composited with the 3D video media in some cases to achieve such high levels of integration. A 3D canvas is created or built and then a 3D model is made of such a 3D set or canvas. The 3D canvas or set may be provided by placing larger opening or less dense toule or scrim layers and then providing next layers that have smaller and smaller openings (more and denser materials). The different layers may be placed at different angles to catch different portions of the laser light. Some of the layers or reflective elements may be moved during the projection such as with rotation (by motors) or by air movement (by fans) to achieve time-varying volumetric displays with the 3D canvas or set.

Then a particle generator can be used to generate the content or laser media (such as based on the video media file/content) to provide the left and right eye image streams provided by the first and second (left and right) scanning lasers. The physics are defined for the particles, and then a trajectory is created and stored for the particles that maps the particles to 2D and 3D projection surfaces and props in the display environment or space. During concurrent projection on a single surface, the two types of light are blended together, and this projection step/function may be thought of as providing an overlay of 3D video light and 3D-providing laser light. The laser light may be just a bit brighter than the video (e.g., within 5 to 25 percent of the luminosity of the video). The video may be thought of as the background layer, and both projected content are running on the same timeline for synchronous projection (e.g., on a closed control loop).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, the scanning lasers used for the first and second light sources may also be adapted to output first and second coherent light beams whose reflections from projection surfaces can be perceived with non-WMV 3D glasses. In one such 3D display system, the first and second light sources may each include one or more filters or optical components such that the light from the first and second scanning lasers is linearly or circularly polarized in two different ways. The viewer wears glasses adapted with left and right lenses adapted to each pass light with one of these two linearly or circularly polarizations.

In other embodiments, active shutter glasses may be worn by the viewer. In these embodiments, the 3D display systems are modified to include synchronized output of the left and right eye light streams from the pair of scanning lasers (such as with synchronized control signals or output shutters) to the active glasses worn by the viewer. In this way, a pair of scanning lasers that are media driven are used to provide projected 3D content (e.g., to provide left and right eye imagery) even in systems not utilizing WMV technologies.

The 3D display systems may be provided in lengths of rides where no conventional 3D projector is provided to provide 3D entertainment at a much lower cost and in settings where other 3D content are not suited such as in higher ambient light environments where bright laser light is better suited. The beams of coherent light from the pair of scanning lasers may be provided on conventional projection screens or other surfaces that may not be planar and may even be lower reflectivity such as upon ride scenery. The 3D display systems may also be incorporated into an interactive setting such as game play where viewers (in a ride vehicle or walking through a viewing space) provide input (e.g., fire weapons) that cause the scanning lasers to be operated to provide the projected 3D content (e.g., to project imagery associated with an object exploding).

We claim:

1. A display system for creating three dimensional (3D) imagery for a viewer in a viewing space wearing 3D stereo glasses with a first lens passing colored light in a first range of wavelengths and with a second lens passing colored light in a second range of wavelengths differing from the first range of wavelengths, comprising:
    a display surface facing the viewing space;
    a first wavelength multiplex visualization (WMV) light source outputting a first light stream onto an area of the display surface, wherein the first light stream has a wavelength in the first range of wavelengths;
    a second WMV light source outputting a second light stream onto the area of the display surface concurrently with the first light stream, wherein the second light stream has a wavelength in the second range of wavelengths; and
    a 3D projector projecting 3D content onto the display surface in the area using a third light stream with light in both the first and second ranges of wavelengths, wherein the projecting is performed concurrently with the outputting of the first and second light streams by the first and second WMV light sources, whereby the viewers concurrently perceives a blending of a pair of 3D objects,
    wherein the first and second WMV light sources each comprises a scanning laser,
    wherein the first and second light streams comprise coherent light producing a first one of the 3D objects in the pair of 3D objects via particle-based media, and
    wherein the third light stream produces a second one of the 3D objects in the pair of 3D objects via pixel-based media.

2. The display system of claim 1, wherein the scanning laser of each of the first and second WMV light sources comprises a scanning laser providing red, green, or blue coherent light.

3. The display system of claim 1, wherein the scanning laser of each of the first and second WMV light sources comprises a full red, green, and blue (RGB) scanning laser.

4. The display system of claim 1, wherein the first and second WMV light sources are media driven, whereby the first and second light streams provide left and right eye images of a 3D scene or object on the display surface.

5. The display system of claim 1, further comprising a controller operating the first and second WMV light sources based on a media file defining at least one 3D object.

6. The display system of claim 5, wherein the 3D object moves from a first location on the display surface to a second location on the display surface.

7. The display system of claim 5, further comprising a 3D set spaced apart from the display surface and wherein the first and second WMV light sources are controlled to move the first one of the 3D objects from the display surface into the 3D set while the 3D projector is concurrently operated to continue to project the 3D content onto the display surface.

8. The display system of claim 1, wherein the 3D projector comprises at least one projector implementing a narrowband-based WMV or a laser projector-based WMV.

9. A display system for creating three dimensional (3D) imagery for a viewer in a viewing space wearing 3D stereo glasses, comprising:
    a display surface facing the viewing space;
    a first wavelength multiplex visualization (WMV) light source outputting a first light stream onto the display surface, wherein the first light stream has a wavelength in a first range of wavelengths defined for a WMV technology;
    a second WMV light source outputting a second light stream onto the display surface concurrently with the first light stream, wherein the second light stream has a wavelength in a second range of wavelengths defined for the WMV technology; and
    a 3D projector projecting 3D content onto the display surface using a third light stream differing from the first and second light streams and with non-coherent light in the first and second ranges of wavelengths, wherein the first and second WMV light sources are external to and spaced apart from the 3D projector,
    wherein the projecting is performed concurrently with the outputting of the first and second light streams by the first and second WMV light sources, whereby the viewer concurrently perceives a blending of a pair of 3D objects, and
    wherein the first and second WMV light sources each comprises a scanning laser providing coherent light.

10. The display system of claim 9, wherein the scanning laser of each of the first and second WMV light sources comprises a scanning laser providing red, green, or blue coherent light.

11. The display system of claim 9, wherein the scanning laser of each of the first and second WMV light sources comprises a full red, green, and blue (RGB) scanning laser.

12. The display system of claim 9, wherein the first and second WMV light sources are media driven, whereby the first and second light streams provide left and right eye images of a 3D scene or object on the display surface.

13. The display system of claim 9, further comprising a controller operating the first and second WMV light sources based on a media file defining at least one 3D object.

14. The display system of claim 13, wherein the 3D object moves from a first location on the display surface to a second location on the display surface.

15. The display system of claim 13, further comprising a 3D set spaced apart from the display surface and wherein the first and second WMV light sources are controlled to move the 3D object from the display surface into the 3D set.

16. The display system of claim 7, wherein the first and second WMV light sources each comprises a scanning laser and wherein the 3D set comprises reflective elements comprising material with a reflectivity of less than about 20 percent.

17. The display system of claim 7, wherein the WMV light sources are controlled to provide the first and second light streams onto the area of the display surface at a first level of brightness and onto the 3D set at a second level of brightness greater than the first level of brightness.

18. The display system of claim 17, wherein the first level of brightness is within 25 percent of or is less than an illumination level of the 3D content projected by the 3D projector.

19. The display system of claim 17, wherein the second level of brightness is at least twice the first level of brightness.

20. The display system of claim 7, wherein the 3D object is moved in the area of the display surface, between the display surface and the 3D set, and within the 3D set according to a predefined trajectory for the 3D object, whereby the 3D object is perceived by the viewer to have a plurality of locations within the created 3D imagery.

21. A display system for creating three dimensional (3D) imagery for a viewer in a viewing space wearing 3D stereo glasses, comprising:
  a display surface facing the viewing space;
  a first wavelength multiplex visualization (WMV) light source outputting a first light stream onto the display surface, wherein the first light stream has a wavelength in a first range of wavelengths defined for a WMV technology;
  a second WMV light source outputting a second light stream onto the display surface concurrently with the first light stream, wherein the second light stream has a wavelength in a second range of wavelengths defined for the WMV technology, wherein a combination of the first and second light streams provides a first 3D object, and wherein the first and second WMV light sources each comprises a scanning laser;
  a 3D projector projecting a third light stream, differing from the first and second light streams, onto the display surface to provide a second 3D object with light have wavelengths in both the first and second ranges of wavelengths; and
  a 3D set spaced apart from the display surface and wherein the first and second WMV light sources are controlled to move the 3D object from the display surface into the 3D set,
wherein the 3D set comprises reflective elements comprising material with a reflectivity of less than about 20 percent, and
wherein the WMV light sources are controlled to provide the first and second light streams onto the area of the display surface at a first level of brightness and onto the 3D set at a second level of brightness greater than the first level of brightness.

* * * * *